United States Patent [19]

Steingroever

[11] Patent Number: 4,818,305

[45] Date of Patent: Apr. 4, 1989

[54] PROCESS FOR THE PRODUCTION OF ELONGATED ARTICLES, ESPECIALLY MAGNETS, FROM HARD POWDERED MATERIALS

[75] Inventor: Erich Steingroever, Bonn, Fed. Rep. of Germany

[73] Assignee: Magnetfabrik Bonn GmbH, Bonn, Fed. Rep. of Germany

[21] Appl. No.: 607,732

[22] Filed: May 9, 1984

Related U.S. Application Data

[63] Continuation of Ser. No. 332,330, Dec. 18, 1981, abandoned.

[30] Foreign Application Priority Data

Dec. 18, 1980 [DE] Fed. Rep. of Germany ....... 3047701

[51] Int. Cl.$^4$ .......................... H01F 41/02; H01F 1/08
[52] U.S. Cl. ..................................... 148/103; 148/104
[58] Field of Search ............... 148/103, 104, 126.1; 29/608, 609, 420.5; 75/214; 419/6; 428/611, 928

[56] References Cited

U.S. PATENT DOCUMENTS

| | | | |
|---|---|---|---|
| 1,974,079 | 9/1934 | Maier | 29/608 |
| 2,903,329 | 9/1959 | Weber | 29/608 |
| 3,051,988 | 9/1962 | Baermann | 18/12 |
| 3,066,403 | 12/1962 | Brauchler | 29/420.5 |
| 3,550,051 | 12/1970 | Parker | 148/103 |
| 3,596,350 | 8/1971 | Steingroever | 148/103 |
| 3,887,395 | 6/1975 | Martin | 148/103 |
| 3,892,598 | 7/1975 | Martin | 148/103 |
| 3,899,821 | 8/1975 | Ito | 148/126 |
| 3,933,535 | 1/1976 | Becker | 148/103 |
| 4,076,561 | 2/1978 | Lee | 148/103 |
| 4,252,434 | 2/1981 | Nakamura et al. | 355/3 DD |
| 4,270,487 | 6/1981 | Terashima et al. | 355/3 DD |
| 4,292,923 | 10/1981 | Huggins | 355/3 DD |
| 4,384,545 | 5/1983 | Burnham et al. | 355/3 DD |
| 4,485,760 | 12/1984 | Tanaka et al. | 355/3 DD |

FOREIGN PATENT DOCUMENTS

| 57493 | 5/1978 | Japan | 148/104 |
|---|---|---|---|
| 238022 | 7/1969 | U.S.S.R. | 29/608 |

Primary Examiner—John J. Zimmerman
Attorney, Agent, or Firm—Fisher, Christen & Sabol

[57] ABSTRACT

In the production of press molded articles, such as permanent magnets made from anisotropic powder materials, a more nearly uniform distribution of the particles is obtained by the forming of a preliminary series of articles, each being only a fraction of the length of the final product, after which the preliminary articles are combined under lengthwise pressure in a mold. Pressure may be applied as each preliminary article is added in the mold and the final article may be sintered or a plastic binder may be added and cured by heating.

16 Claims, 2 Drawing Sheets

PROCESS FOR THE PRODUCTION OF ELONGATED ARTICLES, ESPECIALLY MAGNETS, FROM HARD POWDERED MATERIALS

This is a continuation of application Ser. No. 332,330, filed on Dec. 18, 1981, now abandoned.

BACKGROUND OF THE INVENTION

The invention concerns a process for the production of elongated press-molded articles, such as anisotropic permanent magnets from anisotropic permanent magnetic powder with one or several pairs of poles on their surface and also pertains to tubular permanent magnets manufactured by the process, which are especially well-suited for use as multipolar copying rolls for copiers, as well as for motors, generators and the like.

The manufacture of anisotropic permanent magnets from anisotropic permanent magnetic powder with one or several pairs of poles on their surface is particularly difficult when such permanent magnets have an axial length which exceeds their thickness or diameter by a multiple.

This is especially noticeable in the case of manufacture of magnetic rolls for electrostatic copiers, in which the permanent magnets extend essentially over the entire length of the roll. It has been customary in the past to attach rod magnets to a tubular carrier, which can be found from sheet metal.

A procedure is already known for the production of plastic-bound anisotropic permanent magnets (German patent No. 12 84 531), in which a mixture of an injectable thermoplastic and a permanent magnetic powder are exposed to an orienting field generated by magnets in an injection mold, while it is ejected into the mold in the liquid-plastic state. This well-known procedure has the disadvantage that a magnetic orienting field must be generated in the mold, which is especially difficult in the case of molds for long tubular permanent magnets. Furthermore, pressing long bodies in a die is often impossible to do due to wall friction; the compaction of the magnetic powder is only imperfectly accomplished in the zone facing away from the ram of the press.

SUMMARY OF THE INVENTION

The purpose of the invention is to create a procedure producing articles from powdered starting materials, such as anisotropic permanent magnets of the type mentioned above, with which it is possible to manfacture, in particular, permanent magnets whose axial length exceeds their thickness or diameter by a multiple, in a simpler and more economical manner.

The process according to the invention offers the advantage that for the manufacture of permanent magnets with variable dimensions, a large amount of different manufacturing equipment is not necessary. Rather, it is possible, depending on the magnetic materials used and the dimensions of the permanent magnets being manufactured, to manufacture several pressed articles from anisotropic permanent magnetic powder, if necessary with a binder, with the desired preferred direction, in order to press these pressed articles further piece-by-piece in a nonmagnetic die to form a single pressed article with the desired final dimensions, whicih then, after reaching the desired shape, is ejected from the die and transformed into a solid body by sintering or by binding with plastic and corresponding heating.

If the pressed articles are already premagnetized in a preferred direction, when placed in the die, they usually arrange themselves in the preferred direction, since the opposite poles attract and come to lie close to one another. Each pressed article, after being placed in the die, is preferably pressed with a ram onto the pressed articles already in the die. When this is done, it has been found, surprisingly, that even when they are pressed together without a magnetic field, the preferred direction of the pressed articles are essentially preserved.

The use of anisotropic permanent magnetic powder of barium ferrite or strontium ferrite, or when necessary, the use of anisotropic permanent magnetic powder of barium ferrite, strontium ferrite, or rare earth/cobalt alloys with a plastic binder, has been found to be especially advantageous for the manufacture of permanent magnets according to the process of the invention. However, the process can also be employed when other highly coercive magnetic materials are used. The use of the procedure for manufacturing tubular permanent magnets with several pairs of poles running parallel to the axis on their surfaces is especially advantageous, and with respect to the strength of the finished permanent magnets, especially outstanding results have been achieved by using pressed articles displaying a preferably conical depression with an elevated periheral margin on at least one end surface lying in the direction of pressing.

Such tubular permanent magnets produced according to the invention are characterized by a ratio of length to diameter of at least 5:1, but permanent magnets with a smaller ratio of length to diameter can also be manufactured advantageously according to the invention.

The process according to the invention is explained in greater detail below with reference to the preferred embodiments shown schematically on the drawings.

DETAILED DESCRIPTION OF THE INVENTION

Figure 1:
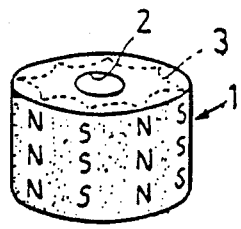
FIG. 1 is a perspective view of a preformed pressed article.

The prefabricated pressed article in FIG. 1, for example, is an eight-poled ring-shaped article 1 made from anisotropic permanent magnetic powder, which has a cylindrical central opening 2 and is magnetically aligned.

Figure 2:
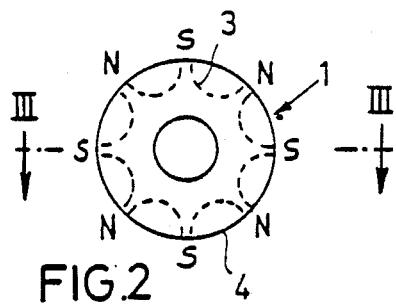
FIG. 2 is a plan view of the pressed article of FIG. 1.

As shown in FIG. 1 and 2, the preferential magnetic directions 3 on the pressed article 1 extend in a curve between the alternating magnetic north and south poles, indicated by N and S, on the periphery 4 of the pressed article.

Figure 3:
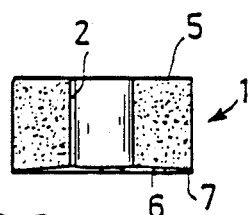
FIG. 3 is a vertical cross-section taken on the line III—III of FIG. 2.

As FIG. 3 shows, the pressed article 1 is formed with a conical depression 6 on at least one of its two end surfaces lying in the direction of pressing so that when pressed together with a neighboring pressed article, it does not initially come into contact with its entire end surface 5, but only with the elevated outer margin 7 of the depression 6, in order to be bonded over its full area with the neighboring pressed article 1 as a result of increasing pressure.

Figure 4:
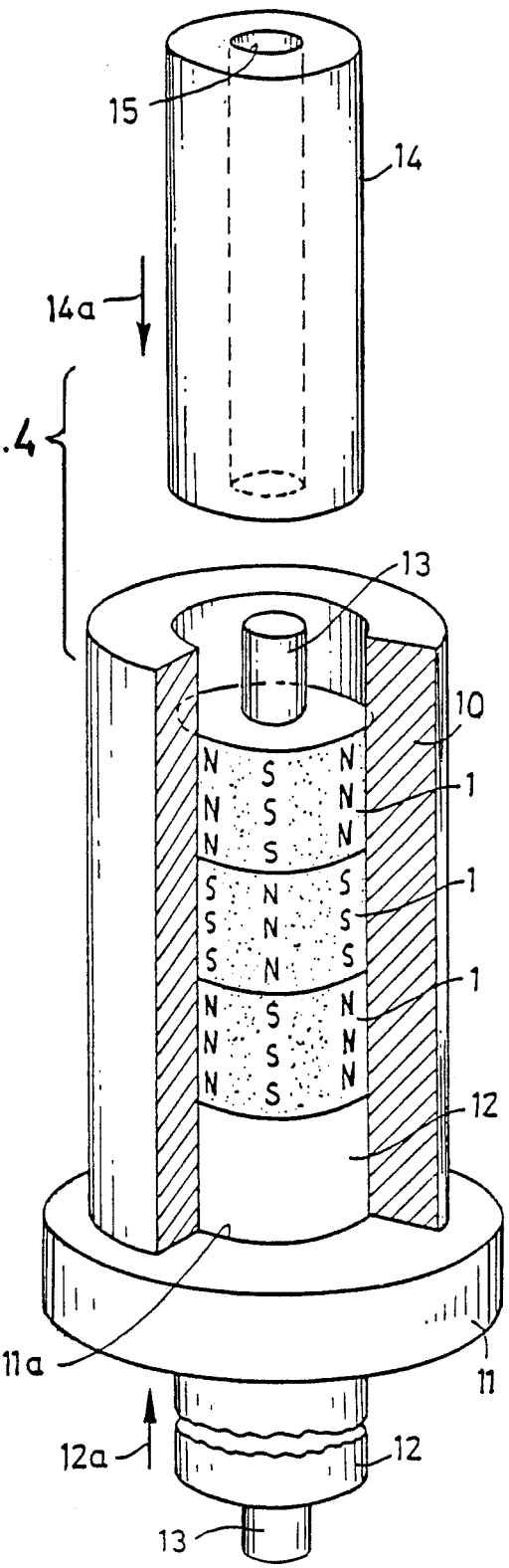
FIG. 4 is a schematic perspective view, partially broken away to show the interior, of a mold containing several preformed articles and an axially movable tubular ram.

The press mold shown in FIG. 4 for manufacturing permanent magnets consists of a non-magnetic mold 10 without an orienting magnetic field and an also non-magnetic ring-shaped base 11, in whose central opening 11a, a lower ram 12 serving as the ejector is arranged to be movable in the direction of the arrow 12a. The lower ram 12 extends into the interior of the die and, when necessary, may consist entirely of magnetic or nonmagnetic material. In the lower ram 12, a fixed central rod 13 is arranged which extends to the upper end of the mold 10 and has such a diameter that it accepts the pressed article 1 loosely inserted into the mold 10 with a radial clearance such that the latter can line up its north and south poles N and S in the preferred directions. Above the mold 10 is an upper ram 14 with a central opening 15 with which each pressed article 1, after being placed in the mold 10, is pressed in the direction of the arrow 14a onto the pressed article 1 present in each case and solidly bonded to it.

In the production of permanent magnets, the procedure used is such that at first the necessary pressed articles 1 are produced from an anisotropic permanent magnetic powder such as barium ferrite or strontium ferrite or from barium strontium ferrite, ore rare earth-/cobalt alloys with a plastic binder, with the desired preferred directions indicated by broken lines 3.

These prefabricated aligned premagnetized pressed articles 1 are then placed in the mold 10 and one or several of them are pressed onto the previously pressed article 1 until the desired length of the permanent magnet is reached, which is then ejected from the mold 10, and compacted into a solid body by sintering or by binding with plastic and corresponding heating.

The plastic binding can take place since a small percentage of plastic powder is mixed in with the permanent magnetic powder, which, after the manufacture of the entire article 1, can be hardened by heating at, for example, 150° to 250° C. or 423° to 533° K.

The tubular permanent magnets manfactured according to the procedure can immediately have a ratio of length to diameter of at least 5:1 and are especially well-suited for use as multipolar copying rolls for electrostatic copy machines. However, they can also be used for motors, generators and the like.

Figure 5:
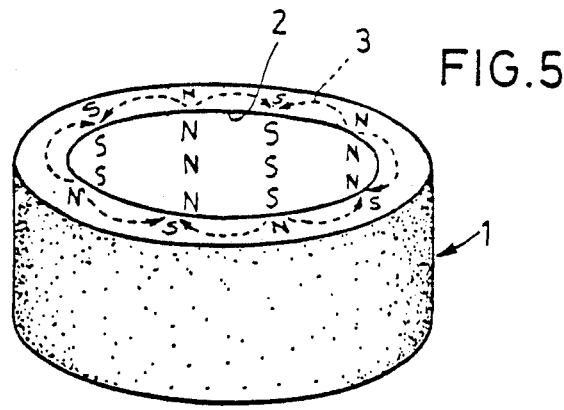
FIG. 5 is a perspective view of a modified type of preformed article.

According to the invention, as seen in FIG. 5, tubular permanent magnets with relatively small wall thickness and magnetic poles on the inner surface can also be produced if pressed articles 1, with internal pole pairs N and S, are pressed into a longer tube in a mold as shown in FIG. 4.

Figure 6:
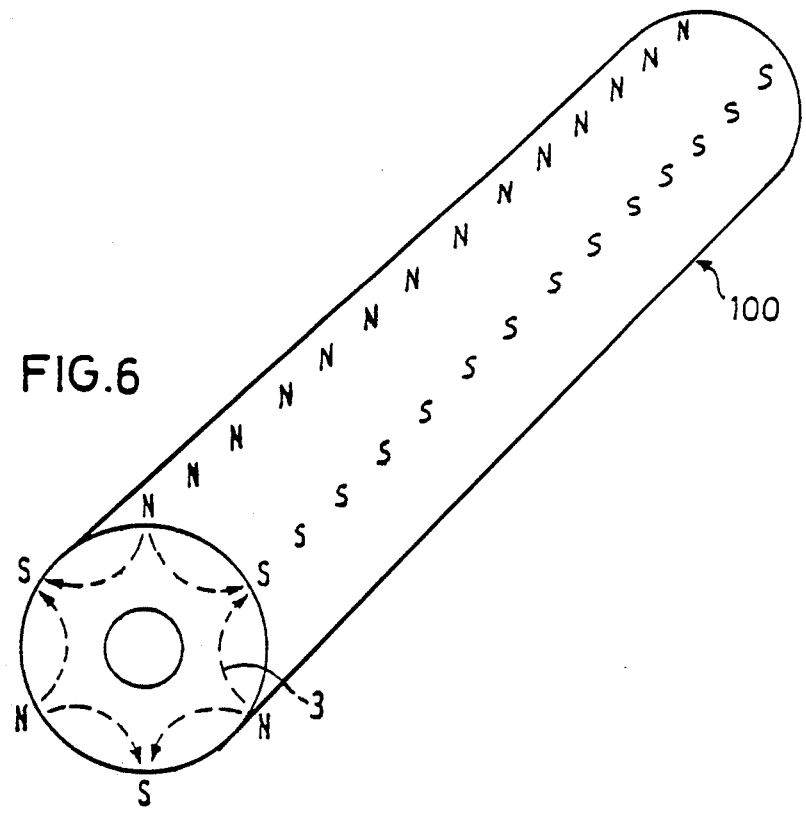
FIG. 6 is a perspective view of a multipolar tubular magnetic roll manufactured from preformed pressed articles.

A finished tubular magnetic roll 100 with magnetic poles N and S is shown in FIG. 6. The individual pressed articles 1 manufactured according to the invention are burnt, sintered, or bounded by heating into a single coherent solid body after compression and then magnetized in the preferred directions with poles N and S running in the lengthwise direction. Upon burning or sintering above the Curie Temperature, e.g., somewhat above 450° C. or 723° K., in the case of ferrite magnets, the magnetization produced by the original orienting field vanishes, but the preferred directions of the magnetic domains are preserved so that the finished magnets can again be magnetized with poles N and S running along the length of the magnet.

What is claimed is:

1. A process for the production of an elongated anisotropic permanent magnet body, having at least one pair of oppositely polarized surface regions, each region continuously extending along the length thereof, from anisotropic permanent magnet powder, comprising the steps of:

forming a plurality of sections from anisotropic permanent magnet powder under pressure and the influence of an orienting multipolar magnetic field;

each of said plurality of sections being formed having two generally planar, parallel sides and a circular periphery; each of said plurality of sections having a diameter and a thickness;

said orienting multipolar magnetic field being applied to each individual one of said plurality of sections during the forming thereof under pressure to magnetize said each individual one to have a plurality of magnetic poles spaced uniformly about said circular periphery so as to form oriented magnetic domains in each said section oriented according to said orienting multipolar magnetic field whereby a preferred direction of magnetization exists in each said section; whereby each individual one of said plurality of sections has an initial magnetization;

stacking at least two, but less than the total number of said sections required to form a final magnet body, one upon another such that at least one of said generally planar, parallel sides of each stacked section abuts a generally planar side of an adjacent stacked section, the section being stacked in an elongated nonmagnetic mold;

the magnetic poles of adjacent sections causing alignment of adjacent sections by attraction of opposite magnetic poles, such that opposite magnetic poles of adjacent sections abut one another;

applying pressure on said stacked sections in a lengthwise direction in the absence of an orienting magnetic field so as to form a single coherent body from said stacked section; said single coherent body having a predetermined length;

releasing said pressure, stacking at least one additional one of said sections in said mold upon said previously stacked sections and again applying pressure on all of said stacked sections in a lengthwise direction to continue the formation of a coherent body from all of the sections stacked in said mold; said coherent body having a length and a width, said width being generally equal to said diameter of each of said plurality of sections;

removing said coherent body from said mold and subjecting it to heat to sinter said single coherent body at sufficiently high temperature that said single coherent body loses its magnetization;

and applying a second multipolar magnetic field having each respective north and south magnetic region extending along the length of said single coherent body such that said single coherent body is magnetized in the preferred direction of magnetization of said oriented magnetic domains, linearly alternating ones of said sections of said coherent body being oppositely magnetized by said second multipolar magnetic field relative to said initial magnetization so as to form a final permanent magnet body having at least one pair of oppositely magnetically polarized surface regions, each polarized surface region extending lengthwise along substantially entirely said predetermined length of said final premanent magnet body, each polarized surface region including a single magnetic polarity.

2. A process according to claim 1, wherein plastic binder is combined with said coherent body after applying said pressure and prior to said heating to form the final magnet body.

3. A process according to claim 1, wherein said permanent magnet powder comprises barium ferrite.

4. A process according to claim 3, wherein the length to width ratio of said single coherent body is at least 5:1.

5. A process according to claim 3, wherein said sections are ring-shaped, said mold being configured to produce tubular coherent bodies, and during said heating to form said final permanent magnet body, said coherent body being subjected to the influence of a magnetic field to produce a plurality of pairs of lengthwise extending magnetic poles on the exterior surface of the final magnetic body.

6. A process according to claim 3, wherein at least one of said sections is provided with a concave conical face extending across the entire surface of at least one of said parallel sides.

7. A process according to claim 1, wherein said permanent magnet powder comprises strontium ferrite.

8. A process according to claim 7, wherein the length to width ratio of said single coherent body is at least 5:1.

9. A process according to claim 7, wherein said sections are ring-shaped, said mold being configured to produce tubular coherent bodies, and during said heating to form the final permanent magnet body, said coherent body being subjected to the influence of a magnetic field to produce a plurality of pairs of lengthwise extending magnetic poles on the exterior surface or the final magnet body.

10. A process according to claim 7, wherein at least one of said separate subdivided sections is provided with a concave conical face extending across the entire end surface of at least one of said parallel sides.

11. A process according to claim 1, wherein said permanent magnet powder comprises rare earth/cobalt alloys with a plastic binder.

12. A process for the production of articles in an elongated cylindrical mold from a hard, powdered material under pressure, comprising the steps of:

providing a mold having a cylindrical interior shape including an inner diameter, an open end, and a closed end;

producing under pressure and the influence of an orienting multipolar magnetic field a plurality of separate preformed articles having a length and a diameter substantially the same as that of said inner diameter of said mold but having only a fraction of the length of the final article to be formed therefrom;

each preformed article having a pair of generally planar, parallel sides, a generally cylindrical outer periphery, and a plurality of magnetic poles produced by said orienting multipolar magnetic field;

said orienting multipolar magnetic field being applied during the forming of each of said articles to magnetize each article to have a plurality of magnetic poles spaced about said cylindrical outer periphery so as to form oriented magnetic domains in each said article oriented according to said orienting multipolar magnetic field, whereby a preferred direction of magnetization exists within each said article;

introducing at least two of said preformed articles into another mold having a hollow cylindrical interior shape and an inner diameter slightly larger than that of said articles, said articles in said another mold being arranged in abutting contact with one another;

the opposite magnetic poles of adjacent articles causing alignment of said articles by magnetic attraction such that opposite magnetic poles of adjacent articles are aligned adjacent one another;

applying pressure on said preformed articles in said mold by a ram at least once prior to the introduction of a last one of said preformed articles into said another mold and again applying pressure on all of the preformed articles in said another mold after said last one of said preformed articles has been introduced, thereby forming a single coherent body;

said another mold having a ratio of its cylindrical interior length to its cylindrical diameter greater than 5 to 1; and subjecting said single coherent body to heat to sinter said single coherent body at sufficiently high temperature that said single coherent body loses its magnetization without disturbing said oriented magnetic domains, and applying a multipolar magnetic field along the length of said single coherent body such that said single coherent body is magnetized in the preferred direction of magnetization of said oriented magnetic domains, so as to form a final permanant magnet body having at least one pair of oppositely magnetically polarized surface regions extending lengthwise along said final permanent magnet body, each polarized surface region extending lengthwise along a substantially greater length of said final permanent magnet body than said length of each of said plurality of separate preformed articles, each polarized surface region including a single magnetic polarity.

13. A process according to claim 12, wherein said mold includes an axially extending control rod for forming tubular articles, and each of said preformed articles are ring-shaped.

14. A process according to claim 12, wherein pressure is applied by said ram on the preformed articles after each successive preformed article is introduced into said mold.

15. A process according to claim 12, wherein said powdered

16. A process according to claim 12, wherein said final permanent magnet body includes a plastic binder cured by subjection to said heat.

* * * * *